(12) United States Patent
Chen

(10) Patent No.: US 9,395,553 B2
(45) Date of Patent: Jul. 19, 2016

(54) PAIR OF EYEGLASSES WITH EASILY-INSTALLED AND EASILY-CHANGED EYEGLASS LEGS

(75) Inventor: Tsung-Wen Chen, Taiwan (CN)

(73) Assignee: HWA MAO OPTICAL (XIAMEN) CO., LTD., Xiamen, Fujian (CN)

( * ) Notice: Subject to any disclaimer, the term of this patent is extended or adjusted under 35 U.S.C. 154(b) by 11 days.

(21) Appl. No.: 14/348,614

(22) PCT Filed: Jul. 26, 2012

(86) PCT No.: PCT/CN2012/079197
§ 371 (c)(1),
(2), (4) Date: Mar. 31, 2014

(87) PCT Pub. No.: WO2014/015500
PCT Pub. Date: Jan. 30, 2014

(65) Prior Publication Data
US 2014/0226120 A1    Aug. 14, 2014

(51) Int. Cl.
*G02C 5/22*    (2006.01)
*G02C 5/14*    (2006.01)

(52) U.S. Cl.
CPC ............. *G02C 5/146* (2013.01); *G02C 5/2209* (2013.01); *G02C 2200/02* (2013.01)

(58) Field of Classification Search
CPC ...... G02C 5/22; G02C 5/2209; G02C 5/2254; G02C 5/2281; G02C 2200/02; G02C 2200/06; G02C 2200/08
USPC .............................. 351/119, 121, 153; 16/228
See application file for complete search history.

(56) References Cited

U.S. PATENT DOCUMENTS

| | | | | |
|---|---|---|---|---|
| 5,929,967 A * | 7/1999 | Conner | ........................ | 351/158 |
| 6,217,170 B1 * | 4/2001 | Hsiao | ............................ | 351/153 |
| 7,264,349 B1 * | 9/2007 | Ku | ................................ | 351/153 |
| 2010/0321629 A1 * | 12/2010 | Chen | ............................ | 351/153 |
| 2012/0062831 A1 * | 3/2012 | Sierra | .................. | G02C 5/2209 |
| | | | | 351/121 |

* cited by examiner

*Primary Examiner* — Huy K Mai
(74) *Attorney, Agent, or Firm* — Leong C. Lei

(57) ABSTRACT

A pair of eyeglass with easily-installed and easily-changed eyeglass legs has a pivot stand and a pivot that are directly formed at the eyeglass frame and the eyeglass leg. The pivot has a vertical shaft as a first magnetic element and a horizontal connector to whose forward end a center portion of the vertical shaft is attached. The pivot stand has a vertical slot accommodating the vertical shaft and a recess, as physically extended through a center sector of the vertical slot, for accommodating the horizontal connector at an unfolded state. An upper end and a bottom end of the vertical slot are respectively provided with a second magnetic element and a notch for accommodating the vertical shaft as inserted.

6 Claims, 6 Drawing Sheets

PAIR OF EYEGLASSES WITH EASILY-INSTALLED AND EASILY-CHANGED EYEGLASS LEGS

TECHNICAL FIELD OF THE INVENTION

The present invention is related to a pair of eyeglasses, particularly a pair of eyeglasses with easily-installed and easily-changed eyeglass legs.

DESCRIPTION OF THE PRIOR ART

An ordinary hinge of an eyeglass of the prior art, as shown in FIG. 1, consists of two pivot stands 30, 40 as positioned at the eyeglass frame 10 and an eyeglass leg 20 respectively and a screw 50. The screw 50 is used to constitute a pivot connection that a tool is required for tightening and loosening. Therefore it is inconvenient to assemble, disassemble or exchange the eyeglass legs from the eyeglass of the prior art.

SUMMARY OF THE INVENTION

An objective of the present invention is to provide a pair of eyeglasses with easily-installed and easily-changed eyeglass legs in order to resolve the aforesaid issue such that it is easy and convenient to assemble, disassemble, and exchange the eyeglass legs.

The present invention is disclosed for achieving the above-mentioned objective as follows:

A pair of eyeglasses with easily-installed and easily-changed eyeglass legs includes a pivot stand and a pivot that are directly formed at an eyeglass frame and an eyeglass leg respectively. The pivot is provided with a vertical shaft in a cylinder shape as a first magnetic element and a horizontal connector that a center portion of the vertical shaft is fixed at a forward end of the horizontal connector while its rear end is connected to the eyeglass leg or the eyeglass frame. The pivot stand is provided with a vertical slot for accommodating the vertical shaft of the pivot and a recess physically extended through a center sector of the vertical slot for accommodating the horizontal connector at an unfolded state. An upper and bottom ends of the vertical slot are respectively provided with a second magnetic element and a notch. The vertical shaft of the pivot can be rotably inserted into the vertical slot through the magnetic adhesion between the first and second magnetic elements so as to connect the pivot and the pivot stand.

The vertical slot is of a "C" cross-section with an opening smaller than the diameter of the vertical shaft but larger than the width of the horizontal connector.

The first magnetic element is a magnet bar and the second magnetic element is a magnet block.

The first magnetic element is a magnet bar and the second magnetic element is a metal block able to attach to the magnet bar through magnetism.

The second magnetic element is a magnet block and the first magnetic element is a metal bar able to attach to the magnet block through magnetism.

The first and second magnetic elements are in rectangle, circle or elliptical cross-section.

The pivot stand and pivot are directly formed at the eyeglass frame and the eyeglass leg respectively while the opening of the vertical slot in "C" shape is positioned near the turning section of the eyeglass frame.

A receiver ring is formed at a forward end of the horizontal connector for securing a center portion of the vertical shaft.

As adopting the above-mentioned, easy manufacture can be achieved that the pivot stand and the pivot of the present invention can be directly formed at the eyeglass frame and eyeglass leg while the first and second magnetic elements can be directly positioned at the pivot and pivot stand at forming.

For assembly, the vertical shaft of the pivot can be rotably inserted into the vertical slot of the pivot stand through the magnetic adhesion between the first and second magnetic elements so as to connect the eyeglass leg and the eyeglass frame in a hinging form.

For disassembly or exchange, the magnetism adhesion between the first and second magnetic elements needs to be disengaged and then extract the vertical shaft of the pivot out of the vertical slot of the pivot stand.

Therefore the present invention can avoid the use of screw for connection and the assembly, disassembly and exchange of the eyeglass frame and the eyeglass leg become easy and convenient since a tool is not required for such operations. Further, users can choose a set of preferred eyeglass legs at will in order to match different hair styles and clothes fashions because of the convenience of exchange of the present invention, which will develop as a DIY eyeglass in fashion.

The present invention is further described in detail together with the drawings.

DETAILED DESCRIPTION OF THE PREFERRED EMBODIMENTS

Figure 1:
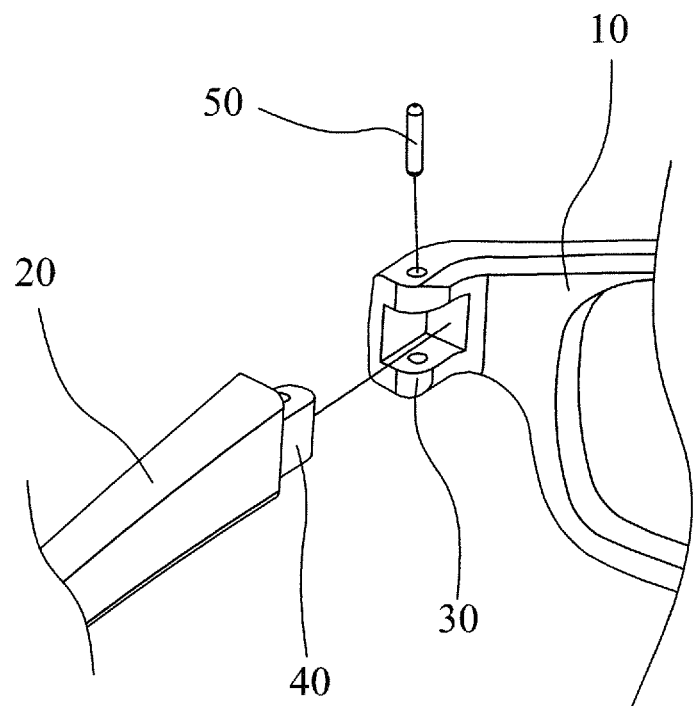
FIG. 1 is a schematic diagram illustrating a hinge of an eyeglass of the prior art.
Figure 2:
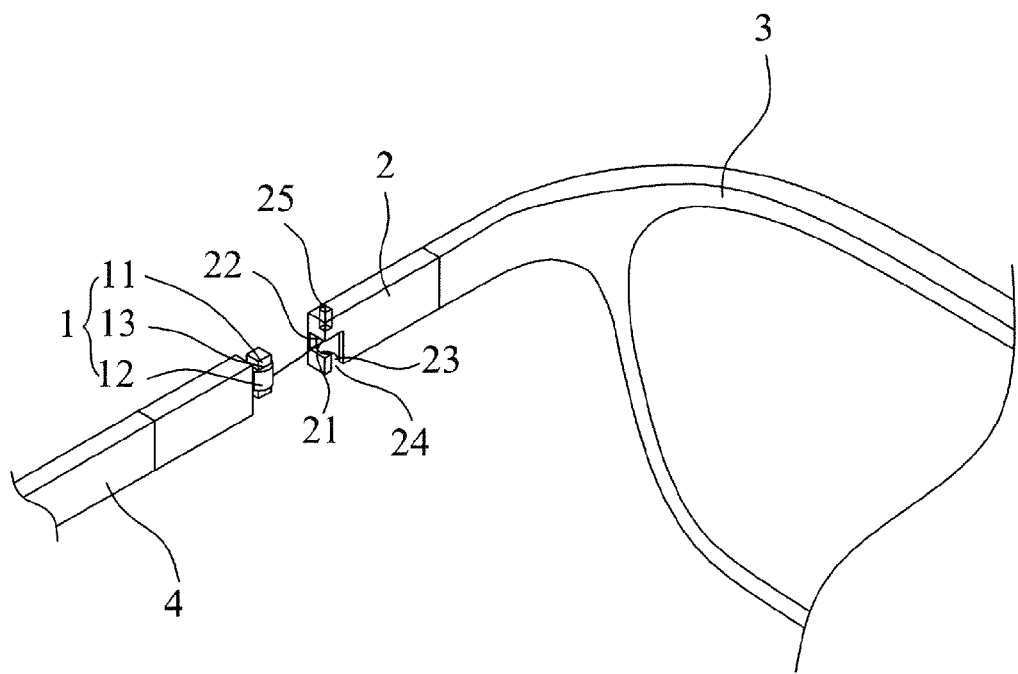
FIG. 2 is a perspective diagram illustrating a disassembly of a first preferred embodiment of the present invention.

FIG. 2 shows a first preferred embodiment of the present invention. A pair of eyeglasses with easily-installed and easily-changed eyeglass legs includes a pivot stand 2 and a pivot 1 that are directly formed at an eyeglass frame 3 and an eyeglass leg 4 respectively. The first preferred embodiment is described below.

The pivot 1 is directly formed at the eyeglass leg 4 and provided with a vertical shaft 11 in a cylinder shape as a first magnetic element and a horizontal connector 12 that a center portion of the vertical shaft 11 is fixed at a forward end of the horizontal connector 12 while its rear end is connected to the eyeglass leg 4. For convenient assembly, a receiver ring 13 is formed at the forward end of the horizontal connector 12 such that a center section of the vertical shaft 11 is secured within the receiver ring 13.

The pivot stand 2 is directly formed at the eyeglass frame 3 and provided with a vertical slot 21 and a recess 22 that the vertical slot 21 is to accommodate the vertical shaft 11 of the pivot 1 while an upper and a bottom ends of the vertical slot 21 are respectively provided with a second magnetic element 25 and a notch 24. The recess 22 is physically extended through a center sector of the vertical slot 21 for accommodating the horizontal connector 12 at an unfolded state. In order to prevent an escape of the pivot 1 along a horizontal direction from the pivot stand 2 after the pivot stand 2 and the pivot 1 assembled, the vertical slot 21 is provided with a "C" cross-section with an opening 23 smaller than the diameter of the vertical shaft 21 but larger than the width of the horizontal connector 12. In further consideration of preventing a random escape of the pivot 1 along the axial direction from the pivot stand 2, in this preferred embodiment the opening 23 of the vertical slot 21 in "C" cross-section is positioned near the turning section of the eyeglass frame 3 so as to misalign the position of the horizontal connector 12 and the position of the opening 23 when the eyeglass leg 4 is at a naturally folded state. Since it is very difficult to fold the eyeglass leg 4 completely next to the eyeglass frame 3 without the application of an external force, the pivot 1 is therefore not able to escape from the pivot stand 2 along the axial direction so as to ensure the hinging connection of the eyeglass of the present invention.

The pivot 1 can be formed at the eyeglass leg 4 and the pivot stand 2 can be formed at the eyeglass frame 3 with the equivalent effectiveness. The first magnetic element (the vertical shaft 11) can be a magnet bar while the second magnetic element 25 can be a magnet block or a metal block that is able to attach to a magnet bar through magnetism. Alternatively the second magnetic element 25 can be a magnet block while the first magnetic element (the vertical shaft 11) can be a metal bar that is able to attach to a magnet block through magnetism. The selection of material for the first magnetic element (the vertical shaft 11) and the second magnetic element 25 is not limited by the present invention provided both of them can attach to each other through magnetism.

In addition, in the first preferred embodiment the first magnetic element (the vertical shaft 11) and the second magnetic element 25 are of a rectangle cross-section. The first magnetic element (the vertical shaft 11) and the second magnetic element 25 can also be made in a circle cross-section (please refer the second embodiment) or an elliptical cross-section (please refer the third embodiment). Upon practical use, the rectangle cross-section yields the better sensation with enhanced bounce when folding and unfolding the eyeglass leg 4.

Figure 3:
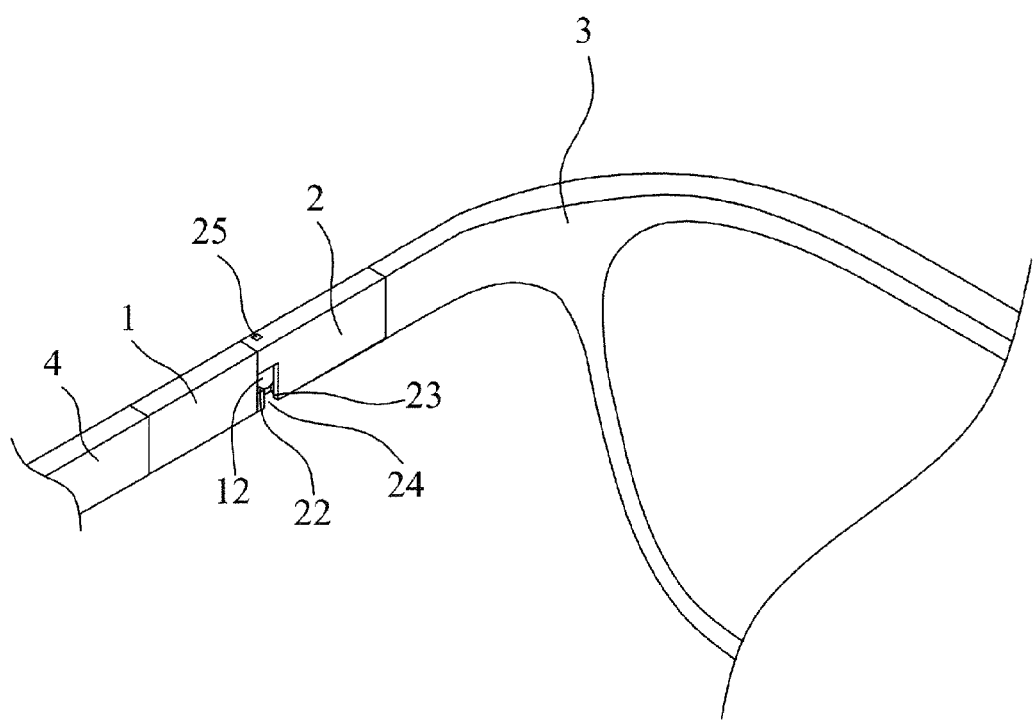
FIG. 3 is a schematic diagram illustrating an assembly of the first preferred embodiment of the present invention.
Figure 4:
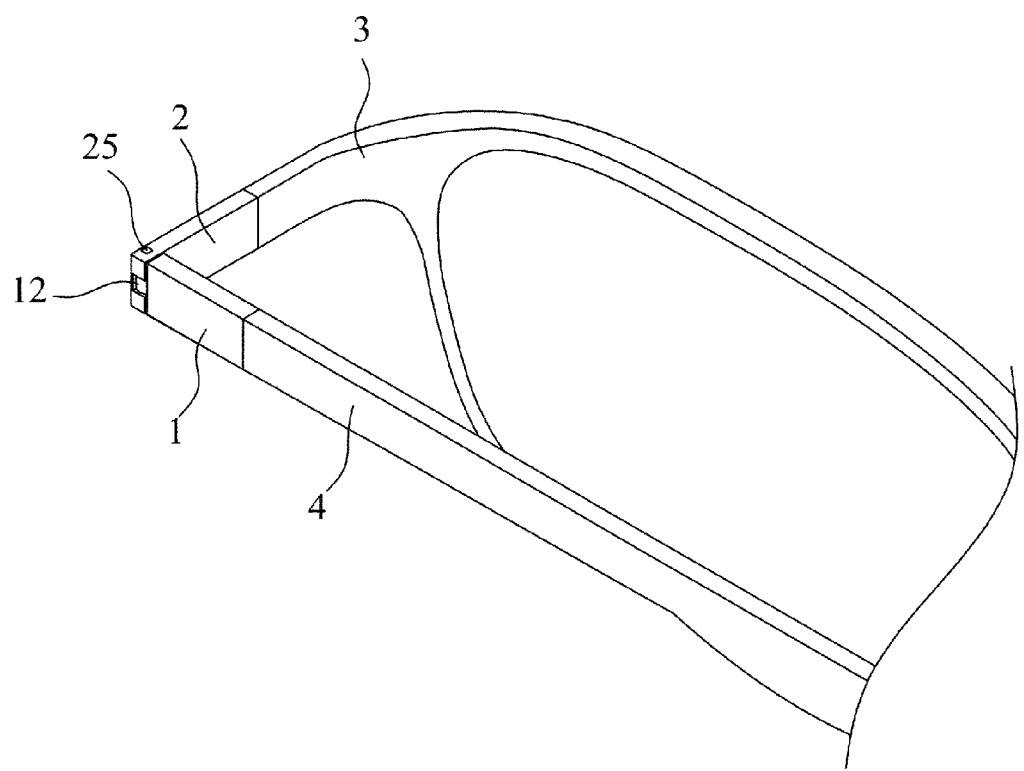
FIG. 4 is a schematic diagram illustrating a folded state of the first preferred embodiment of the present invention.
Figure 5:
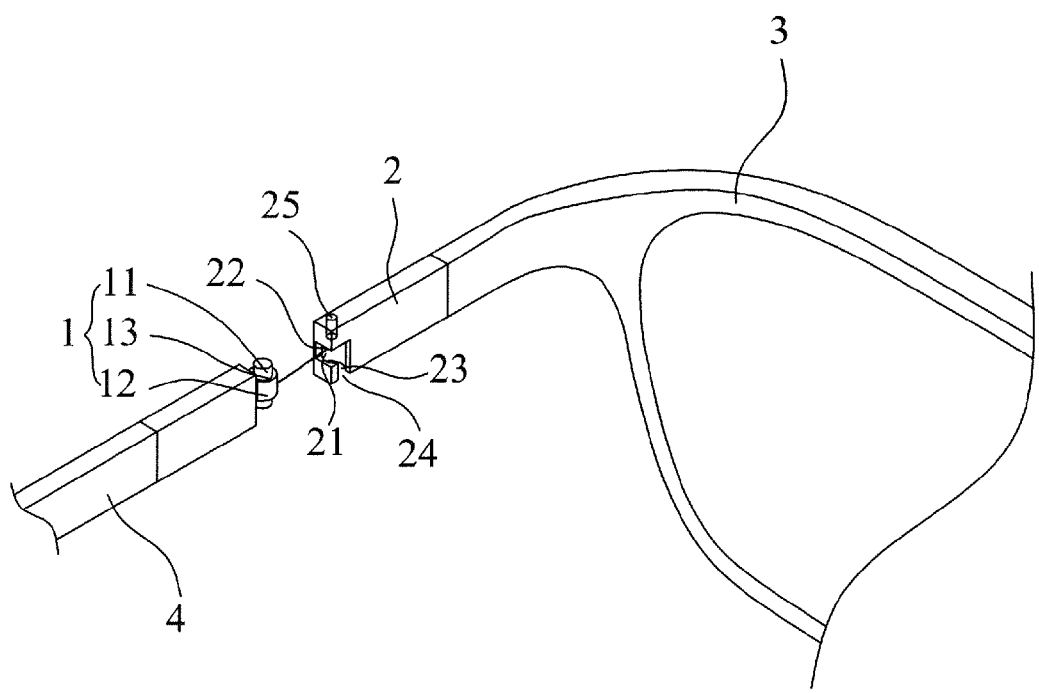
FIG. 5 is a perspective diagram illustrating a disassembly of a second preferred embodiment of the present invention.
Figure 6:
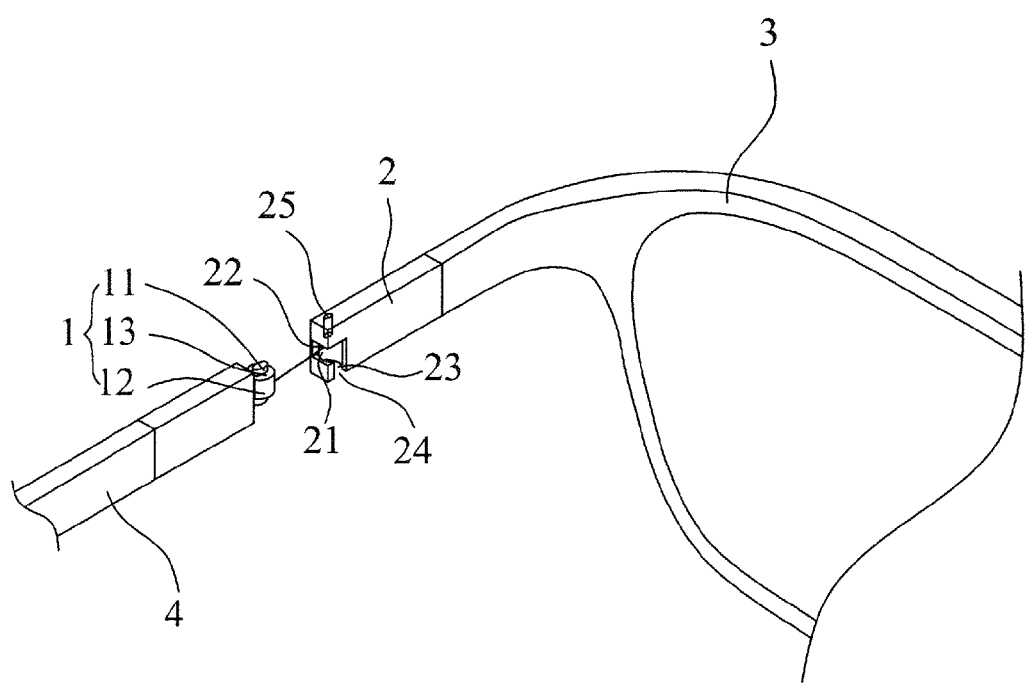
FIG. 6 is a perspective diagram illustrating a disassembly of a third preferred embodiment of the present invention.

When assemble the present invention as shown in FIGS. 3 and 4, the vertical shaft 11 of the pivot 1 needs to be aligned with the notch 24 on the vertical slot 2 of the pivot stand 2 while the horizontal connector 12 needs to be aligned with the opening 23 of the vertical slot 21 in "C" shape of the pivot stand 2. Then the vertical shaft 11 can be rotably inserted into the vertical slot 21 through the magnetic adhesion between the first magnetic element (the vertical shaft 11) and the second magnetic element 25 so as to connect the eyeglass leg 4 and the eyeglass frame 3 in a form of hinging by the pivot stand 2 and the pivot 1. For disassembly, the magnetism adhesion between the first magnetic element and the second magnetic element 25 needs to be disengaged and then the ear-stem 4 needs to pressed in order to align the horizontal connector 12 with the opening 23 and then extract the vertical shaft 11 from the vertical slot 21.

It is understood that the foregoing description is that of the preferred embodiments of the present invention and that various changes and modifications may be made thereto without departing from the spirit and scope of the present invention as defined in the appended claims.

I claim:

1. A pair of eyeglasses with easily-installed and easily-changed eyeglass legs comprising a pivot stand and a pivot mounted to an eyeglass frame and an eyeglass leg respectively; said pivot provided with a vertical shaft in a cylinder shape and a horizontal connector; the vertical shaft, as a first magnetic element, with a center portion fixed to a forward end of the horizontal connector; a rear end of the horizontal connector connected to the eyeglass leg; said pivot stand provided with a vertical slot for accommodating the vertical shaft of said pivot and a recess physically extended through a center sector of the vertical slot for accommodating the horizontal connector at an unfolded state; an upper end and a bottom end of the vertical slot of said pivot stand being respectively provided with a second magnetic element and a notch for accommodating the vertical shaft as inserted; the vertical shaft of said pivot rotatably inserted into the vertical slot of said pivot stand through said notch formed in the bottom end of said vertical slot and attracted by magnetism between the second magnetic element arranged at the upper end of said vertical slot and the first magnetic element of said vertical shaft of said pivot so as to assemble said pivot and said pivot stand, wherein the second magnetic element is opposite to said notch formed in the bottom of said vertical slot to keep the vertical shaft of said pivot in position within the vertical slot of said pivot stand without separating therefrom through the notch formed in the bottom of the said vertical slot;

wherein the vertical slot of said pivot stand has a C-shaped cross-sectional configuration having a side opening that is smaller than the diameter of the vertical shaft of said pivot and larger than a width of the horizontal connector; and wherein the side opening of the vertical slot of said pivot stand is arranged at a position such that the side opening is, at least partly, not in alignment with the horizontal connector of said eyeglass leg when the eyeglass leg is closed to a folded state, in order to prevent the eyeglass leg from moving through the side opening to detach from the eyeglass frame in the folded state.

2. The pair of eyeglasses with easily-installed and easily-changed eyeglass legs of claim 1 characterized in that: the first magnetic element is a magnet bar and the second magnetic element is a magnet block.

3. The pair of eyeglasses with easily-installed and easily-changed eyeglass legs of claim 1 characterized in that: the first magnetic element is a magnet bar and the second magnetic element is a metal block able to attach to the magnet bar through magnetism.

4. The pair of eyeglasses with easily-installed and easily-changed eyeglass legs of claim 1 characterized in that: the second magnetic element is a magnet block and the first magnetic element is a metal bar able to attach to the magnet block through magnetism.

5. The pair of eyeglass with easily-installed and easily-changed eyeglass legs of claim 1 characterized in that: the first magnetic element and the second magnetic element are of a cross-section of rectangle, circle or elliptical.

6. The pair of eyeglasses with easily-installed and easily-changed eyeglass legs of claim 1 characterized in that: a receiver ring is formed at the forward end of the horizontal connector so as to secure the center portion of the vertical shaft.

* * * * *